Figure 1:
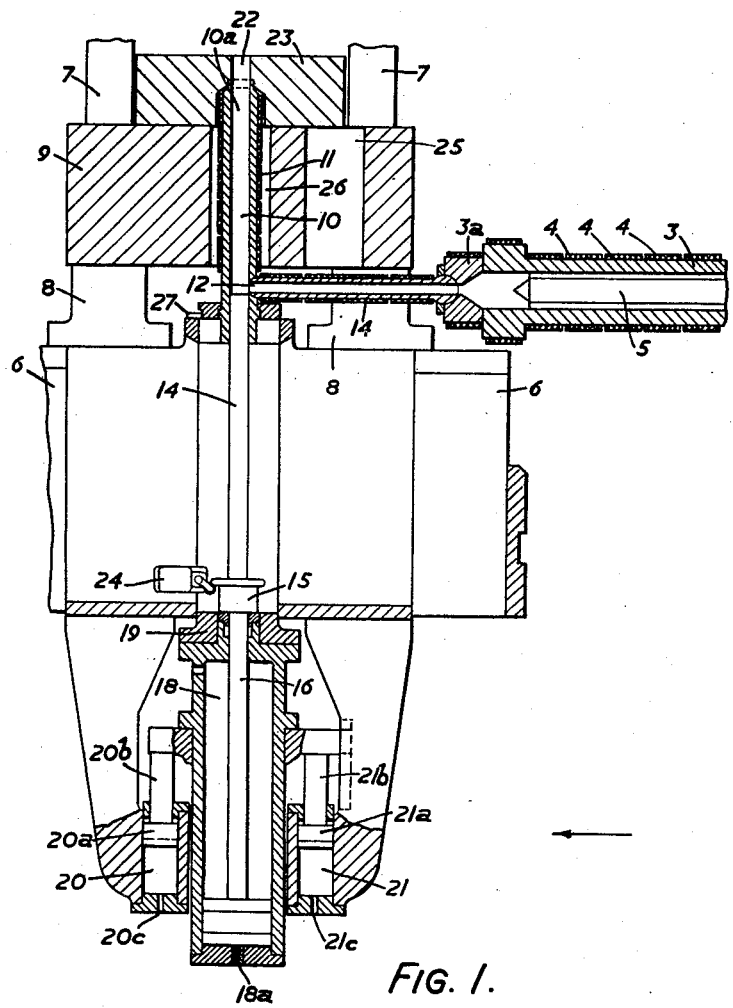

March 12, 1963 K. H. BAIGENT 3,080,610
INJECTION MOULDING MACHINES
Filed May 29, 1961 3 Sheets-Sheet 1

INVENTOR
K. H. Baigent
BY
ATTORNEY

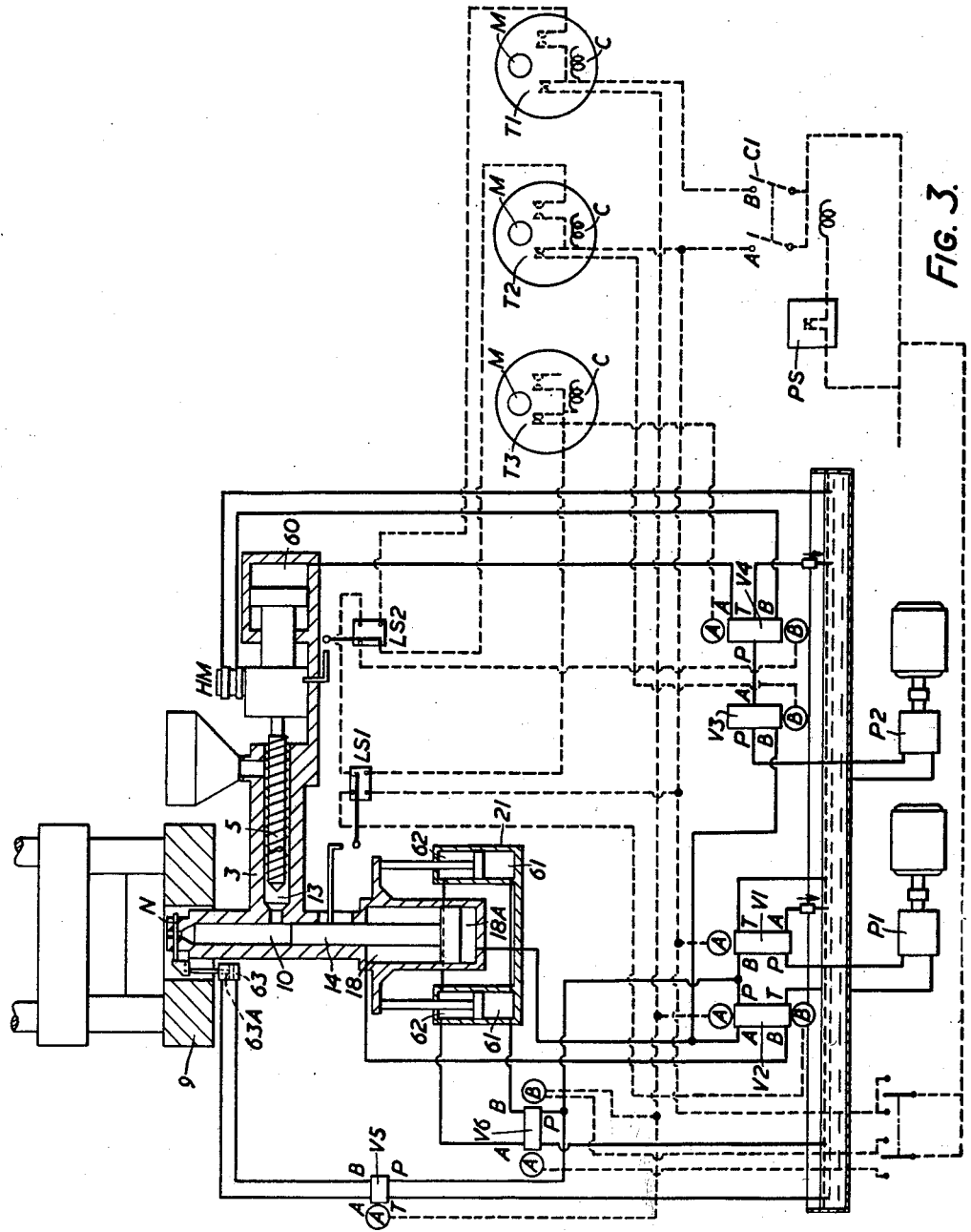

United States Patent Office 3,080,610
Patented Mar. 12, 1963

3,080,610
INJECTION MOULDING MACHINES
Keith Herbert Baigent, Surbiton, Surrey, England, assignor to R. H. Windsor Limited, Chessington, England, a British company
Filed May 29, 1961, Ser. No. 113,374
8 Claims. (Cl. 18—30)

This invention is a continuation-in-part of application Serial No. 684,347 filed on September 16, 1957, and now abandoned, relating to injection moulding machines. The principal object of the invention is to provide an improved form of injection moulding machine capable of moulding articles of thermoplastic materials under substantially higher pressures than is normally possible with standard preplasticising injection moulding machines.

In the specification of my U.S. Patent No. 2,916,769 is described an injection moulding machine which is hydraulically operated and comprises a pre-plasticising injection chamber, means for heating said chamber, means for feeding thermoplastic material in powder or granular form into said chamber, a twin-screw conveyor of which the two conveyor screws intermesh and are rotatable and axially slidable in said chamber, a motor unit slidably mounted in a frame structure and including suitable gearing through which said conveyor screws are rotatably driven in the same direction to feed the thermoplastic material to an injection nozzle at the outer end of said chamber, and an hydraulic piston assembly connected with said motor unit and adapted to move said twin-screw conveyor axially in said chamber to inject thermoplastic material through said injection nozzle into a mould, the twin-screw conveyor, the motor unit and the hydraulic piston assembly being interconnected and slidable as a whole.

With the machine according to the co-pending application, in which the thermoplastic material is injected direct from the preplasticising injection chamber into the mould, a maximum pressure of about 10,000 lbs. per square inch is possible. Such a pressure is suitable for working what is known in the trade as general purposes materials, that is materials such as polystyrene, polystyrene copolymers, acetates and methacrylates and the like. Such pressure is unsuitable however, for moulding articles from so-called rigid vinyls which require a pressure of something in the region of 20,000 lbs. per square inch minimum, and the primary object of the present invention is to provide an injection moulding machine in which higher pressures of 30,000 lbs. per square inch and upwards can be obtained.

With this object in view the present invention consists of an injection moulding machine comprising a preplasticising unit having a substantially horizontal injection chamber for injecting thermoplastic material under pressure into a substantially vertical chamber of a transfer unit and hydraulic means for operating a plunger or ram for injecting the thermoplastic material from the transfer chamber into a mould under greater pressure than the thermoplastic material is injected into the transfer chamber from the injection chamber, and hydraulic means for counterbalancing the reaction pressure of said plunger or ram during the injection stroke of said plunger or ram.

It will thus be understood that with a machine according to the present invention the thermoplastic material, instead of being injected direct from the preplasticising injection chamber into the mould in accordance with the co-pending application is injected from said preplasticising chamber into the transfer injection chamber from which the material is then injected into the mould. In one embodiment of the invention an hydraulically operated plunger is mounted in said transfer chamber and is operated by hydraulic fluid supplied by a pump which drives the screw conveyor in the preplasticising chamber or barrel and, in order to produce the required high speed and pressure, at least one additional pump is provided and means are also provided for bringing both pumps into operation during the injection or operating stroke of the piston or plunger in the transfer chamber.

Figure 2:
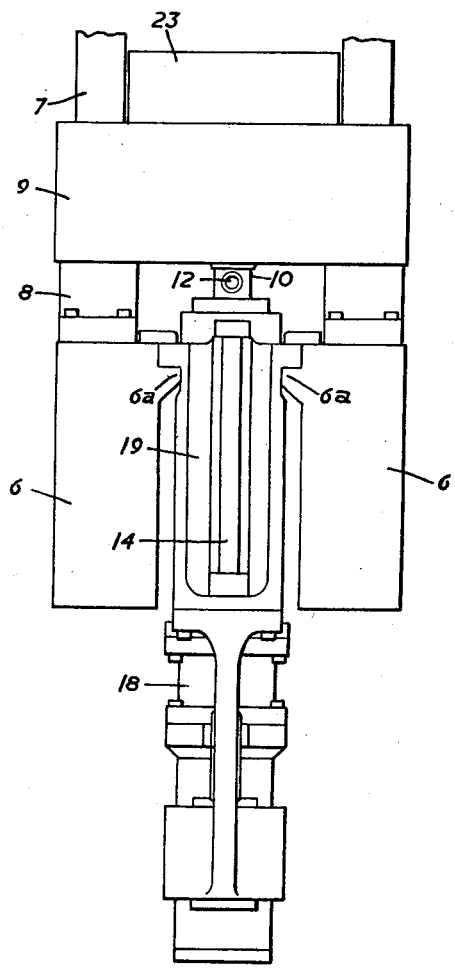

In order that the invention may be more clearly understood one particular embodiment thereof will now be described, by way of example, with reference to the accompanying drawings wherein:

FIGURE 1 is a vertical section of the transfer unit and a part of the preplasticising unit, and
FIGURE 2 is a side elevation of the transfer unit looking in the direction of the arrow in FIGURE 1,
FIGURE 3 is a simplified and purely illustrative schematic diagram of a representative hydraulic and electrical system which may be used to effectuate the operating cycle of applicant's transfer unit in conjunction with a preplasticising unit of the type shown in applicant's U.S. Patent No. 2,916,769.

Referring to these drawings 3 is the preplasticising chamber, 4 the heating elements and 5 the screw conveyor of the preplasticising unit, the construction and function of which is fully described in the specification of my U.S. Patent No. 2,916,769.

The injection transfer unit is supported by base or frame 6 said transfer unit being supported on horizontal slide rails or runways 6a so as to be horizontally slidable on said base or frame 6. Also supported by the base or frame 6 are tie bars 7 mounted on said base or frame by tie bar nuts 8 bolted to said base or frame, said tie bars carrying at their lower ends a mould plate 9 and at their upper ends a so-called prefill assembly (not shown). The prefill assembly includes a movable mould plate and an hydraulic ram, a jack ram and a prefill valve for controlling the movable mould plate all of which assembly is of known construction and needs no further description here.

The transfer unit proper comprises a transfer cylinder or chamber 10 surrounded over the major portion of its length by heating elements 11 for keeping the thermoplastic material at the desired degree of plasticity prior to being injected into the mould. At the upper end the transfer chamber or cylinder is provided with an injection opening or orifice 10a adapted to register in sealing engagement with the inlet orifice 22 of a mould 23. Near the lower end of the transfer chamber or cylinder is a lateral inlet orifice 12 through which the thermoplastic material is injected into said transfer chamber 10 from the preplasticising chamber 3 of the preplasticising unit. The inlet orifice 12 of the transfer chamber or cylinder 10 is connected with the injection nozzle 3a of the preplasticising chamber 3 by an intermediate extension conduit 13 which is surrounded throughout its length by suitable heating elements 14. This intermediate extension conduit 13 is connected with the nozzle 3a of the preplasticising chamber and with the inlet orifice 12 of the transfer chamber or cylinder 10 by ball and socket type connections, that is said conduit 13 is provided at its ends with spherical portions which register with corresponding spherical seatings in the wall of the transfer chamber or cylinder 10 and the injection nozzle 3a. By this means any relative vertical displacement of the transfer unit and the preplasticising unit will not result in damage or fracture of the extension conduit 13 or affect its function and will prevent any stresses from being transferred to the preplasticising unit or the transfer unit.

Slidably mounted within the transfer chamber or cylinder 10 is a transfer injection plunger or ram 14 coupled by means of a suitable coupling 15 with the piston rod 16 of a piston 17 operating in an hydraulic main cylinder 18. The cylinder 18 is bolted to the lower end of a cage structure 19 the upper end of which supports the transfer chamber 10.

Two counter balance cylinders 20 and 21 are arranged one on each side of the main cylinder 18 and the pistons 20a and 21a, slidable in these cylinders 20 and 21, are connected with piston rods 20b and 21b which are in turn rigidly connected with the main cylinder 18 as shown in FIGURE 1. The main cylinder 18 and the two counter-balance cylinders 20 and 21 are connected through ports 18a, 20c and 21c respectively and suitable pipe lines (not shown) with the hydraulic system of the preplasticising unit. The main cylinder 18 functions to operate the transfer plunger or ram 14 and the counterbalance cylinders function to counterbalance the reaction pressure of the plunger or ram during the injection stroke and hold the transfer chamber in tight sealing engagement against the mould orifice 22 as hereinafter more fully described.

The hydraulic system for operating the preplasticising unit, the hydraulic cylinders 18, 20, 21 and the prefill system and the electric or other timing means for operating said parts in the required sequency does not form part of the present invention and is therefore not described in detail but it will be understood that, the required sequency of operation being known, a suitable system can be easily devised by any person skilled in the art. It must be pointed out however that whilst the pump which operates the preplasticising unit is used also for operating the cylinder 18 of the transfer unit it is necessary to provide an additional pump for this purpose in order to impart the required high speed and pressure on the transfer plunger or ram 14.

The operating cycle of the machine is as follows:

At the end of an operating cycle when the transfer plunger 14 is at the top of its injection stroke the mould is open and both pumps are idling.

The mould is then closed, and in closing operates pressure switch PS whose contacts close to energise the coil of contactor C1. Closing of contact A of valve V3 through the normally closed contact of the injection boost period timer T2, and energises solenoid A of valve V1 and the clutch of timer T2 to start its timed period. Closing of contact B of contactor C1 energises solenoid A of valve V2, solenoid A of valve V5 and B of valve V6 (through the normally closed contacts of injecton full period timer T1) and the clutch of timer T1 to start its timed period. As a result of the energisation of the valve solenoids as thus far described, hydraulic pressure is directed: from pump P1 through ports P and B of valve V1; from pump P2 through ports P and B of valve V3; from port B of valve V1 through ports P and A of valve 2; from port B of valve V1 through ports P and B of valve V5 and ports P and B of valve V6; also, ports A and T of valve V5 are placed in communication. Thus, pressurised fluid from pumps P1 and P2 is supplied: to chamber 63 of a nozzle valve cylinder to open a nozzle valve N; to chamber 18A of the injection cylinder to start injection of material into the mould; and to chamber 61 of cylinders 20 and 21.

While the ram 14 of the injection cylinder 10 is advancing, the timer T2 exhibits timed period, whereupon its normally closed contacts open to de-energise solenoid B of valve V3, and its normally open contacts close to energise solenoid B of valve V4, through the closed contacts of limit switch LS2.

Hydraulic pressure from pump P2 is then directed through ports P and A of valve V3 and ports P and B of valve V4 to hydraulic motor HM, which operates to start the refill period of the plasticising chamber and when the plasticising chamber is fully recharged the rearward movement of the plunger screw 5 operates limit switch LS2 to de-energise solenoid B of valve V4. Pump P2 then delivers to tank through ports P and T of valve V4.

Shortly after the contents of chamber 10 have been delivered into the mould, timer T1 ends its timed period and its normally closed contacts open to de-energise solenoid A of valve V2, solenoid A of valve V5, and solenoid B of valve V6, while its normally open contacts close to energise solenoid B of valve V2 through the contacts of limit switches LS2 and LS1. Valve V2 then operates to connect pump P1 with the chamber 18 of the injection cylinder, through ports P and B of valve V2, and chamber 18A of the cylinder is connected to tank through ports A and T of the same valve to commence withdrawal of the ram 14; valve V6 is operated to relieve the pressure in chamber 61. At the same time valve V5 is operated to admit pressure through its ports P and A to chamber 63A of the nozzle valve cylinder to close the nozzle valve N, chamber 63 being connected to tank through ports B and T of valve V5. Withdrawal of the injection ram 14 effects operation of limit switch LS1, thus de-energising solenoid B of valve V2 and energising solenoid A of valve V4 (through the normally closed contacts of screw injection timer T3) and the clutch of timer T3, which starts its timed period. Energisation of solenoid B of valve V2 places ports B and T of the valve in communication, thus connecting cavity 18 with tank. Due to energisation of solenoid A of valve V4, pump P2 supplies pressure fluid through ports P and A of valve V3 and ports P and A of valve V4 to cavity 60. The plasticising screws 5 are thus moved forward to start the injection of the contents of the preplasticising chamber 3 into cavity 10 of the transfer cylinder. When this injection is completed the timer T3 ends its timed period so that its normally closed contacts open to de-energise solenoid A of valve V4 and pump P2 delivers to tank. The mould locking pressure is then relieved, allowing the pressure switch to open. The coil of contactor C1 is thus de-energised and the opening of the contacts of the contactor de-energises solenoid A of valve V1 so that pump P1 delivers to tank.

A hand switch X is provided to allow manual control of the auxiliary cylinders 20 and 21, if required.

At the end of the cooling period the transfer plunger 14 returns to the top position and the mould opens.

According to a further feature of the machine according to the invention the fixed mould plate 9 is provided with an off-centre aperture 25, in addition to the central aperture 26, for use when the machine is to be used for off-set moulding, that is when the mould 23 is not provided with a central inlet orifice 22 but with an off-set orifice. In order to enable the injection transfer chamber 10 to be passed through the aperture 25 in the mould plate 9 when off-set moulding is to be carried out the transfer unit is not only slidable horizontally on the slide rails 6a, as above described, to bring the transfer chamber 10 into alignment with the aperture 25 in the mould plate, but the transfer chamber and its associated parts are vertically displaceable to enable the transfer chamber to be removed from the aperture 26 and located in the aperture 25. The transfer unit is normally held in its upper operative position, that is in the position shown, by a catch 27. When it is desired to change the transfer chamber from the position shown to a position for off-set moulding the catch 27 is removed and the chamber moved vertically downwards against the action of the counterbalance cylinders 20, 21 until the upper end of the transfer chamber is positioned below the upper surface of the mould plate 9. The mould plate 9 is then lifted to clear transfer chamber 10. The transfer unit is then moved horizontally on the slide rails 6a until the said transfer chamber 10 and the aperture 25 in the mould plate are co-axial and the mould plate 9 lowered whereupon the transfer unit is moved back into its operative position under the hydraulic pressure of the counterbalance cylinders 20, 21. The preplasticising unit, which is connected with the transfer unit by the extension conduit 13 is also horizontally slidable on a slide bed, as described in the specification of the aforesaid co-pending application, and must also be moved correspondingly when the transfer unit is moved horizontally. Alternatively, the preplasticising unit may be kept in its original position and the extension conduit 13 replaced by another extension conduit of shorter length.

Although the transfer unit according to the present invention has been described as being used in conjunction with a preplasticising unit of the construction described in my U.S. Patent No. 2,916,769, it must be understood that it may be used in conjunction with any other suitable injection moulding machine having suitable means for injecting the thermoplastic material into the transfer chamber.

I claim:

1. An injection moulding machine comprising a mould, a transfer unit provided with a substantially vertical chamber opening into said mould, a preplasticising unit having a substantially horizontal injection chamber connected to said transfer unit through a constricted extrusion orifice, intermeshing screw conveyors in said injection chamber which are rotatable for feeding a thermoplastic material to said extrusion orifice and axially slidable to inject said thermoplastic material through said orifice into the chamber of said transfer unit, a ram mounted in said transfer unit for movement from a withdrawn position to an advanced position to inject the thermoplastic material from the transfer chamber into said mould, and hydraulic means for rotating said screw conveyors when said ram is in its advanced position, for axially advancing said screw conveyors when said ram is in its withdrawn position and for advancing said ram from its withdrawn to its advanced position with greater force than that exerted when axially advancing said screw conveyors.

2. An injection moulding machine according to claim 1 wherein the transfer injection unit is horizontally slidable and the transfer chamber and its associated parts is vertically displaceable.

3. An injection moulding machine according to claim 2, wherein the transfer chamber passes through an aperture in a mould plate to engage in sealing relationship the mould orifice.

4. An injection moulding machine according to claim 3, wherein the mould plate is provided with a central aperture and an off-centre aperture and the transfer chamber is adapted to be located in the centre or off-centre aperture for centre or off-set moulding respectively.

5. An injection moulding machine according to claim 1, wherein the transfer chamber is arranged substantially vertically and is provided with a lateral inlet orifice connected with the injection nozzle of a substantially horizontal preplasticising chamber of a preplasticising unit.

6. An injection moulding machine according to claim 5, wherein the inlet orifice of the transfer chamber is connected with the injection nozzle of the preplasticising unit by an extension conduit by ball and socket type connections.

7. An injection moulding machine as claimed in claim 1 in which said first mentioned hydraulic means comprises two pumps, both of which coact to advance said ram to inject said plastic material into said mould, one of which is connected to maintain said ram in its advanced position after said material has been injected into said mould during a period in which said material cools, whereas the other pump rotates the screw conveyors during at least part of said cooling period.

8. An injection moulding machine as claimed in claim 1 comprising hydraulic means for counterbalancing the reaction pressure of said ram during its injection stroke.

References Cited in the file of this patent

UNITED STATES PATENTS

| | | |
|---|---|---|
| 2,360,000 | Lawyer | Oct. 10, 1944 |
| 2,705,343 | Hendry | Apr. 5, 1955 |
| 2,724,864 | Krotz | Nov. 29, 1955 |
| 2,916,769 | Baigent | Dec. 15, 1959 |